United States Patent [19]

Kirschner

[11] Patent Number: 5,004,193
[45] Date of Patent: Apr. 2, 1991

[54] ADJUSTABLE LOAD BOLT ADAPTER BRACKET ASSEMBLY

[76] Inventor: Kraig A. Kirschner, P.O. Box 3365, South El Monte, Calif. 91733

[21] Appl. No.: 537,907

[22] Filed: Jun. 11, 1990

[51] Int. Cl.$^5$ .............................................. F16L 3/00
[52] U.S. Cl. ........................................ 248/59; 248/62
[58] Field of Search ...................... 248/59, 62, 65, 73, 248/74.1, 74.4, 214, 58, 72, 313, 230, 354.3, 223.4, 224.4; 403/118

[56] References Cited
U.S. PATENT DOCUMENTS

| 2,725,210 | 11/1965 | Swartz | 408/118 X |
| 3,570,794 | 3/1971 | Kirschner | 248/62 X |
| 3,669,391 | 6/1972 | Suozzo | 248/58 X |
| 3,700,202 | 10/1972 | Donnels | 248/354.3 |
| 4,697,770 | 10/1987 | Kirschner | 248/62 |
| 4,872,634 | 10/1989 | Gillaspy et al. | 248/354.3 X |

Primary Examiner—Ramon O. Ramirez
Attorney, Agent, or Firm—Lyon & Lyon

[57] ABSTRACT

An adjustable load bolt adapter bracket assembly for use with a sway brace in securing a bracing element between a fluid pipeline and a structure to anchor the pipeline to the structure and limit relative movement therebetween. The assembly comprises an attachment member and an adapter plate. The attachment member includes a flat plate portion having an upstanding lateral wall adjacent one end thereof, a pair of axially aligned fastener receiving apertures spaced from the other end thereof and a bracing element receiving member pivotedly mounted on the lateral end wall. The adapter plate defines a first flat portion having a centrally disposed fastener receiving aperture and a second flat portion vertically offset and extending parallel to the first portion, having a pair of spaced fastener receiving apertures therein axially aligned with the apertures in the first portion and vertically offset stops disposed between said portions. By selectively disposing either the first or second portions of the adapter plate over the flat plate portion of the attachment member and aligning either the aperture in the first portion of the adapter plate with the outer aperture in the attachment member or both apertures in the second portion of the adapter plate with the two apertures in the attachment member, the number of available effective fastener receiving apertures in the adapter bracket can be selectively increased from two to three or four, thereby increasing the strength of the securement to meet different seismic codes.

11 Claims, 2 Drawing Sheets

ADJUSTABLE LOAD BOLT ADAPTER BRACKET ASSEMBLY

BACKGROUND OF THE INVENTION

The present invention relates to an adjustable load bolt adapter bracket assembly particularly adapted for use with a sway brace in securing a bracing element between a fluid pipeline and a fixed structure to anchor the pipeline to the structure. Sway braces are commonly used in building structures for securing numerous types of fluid supply lines to the structure to brace the lines against damaging movement such as could result from a seismic disturbance. An, example of such a sway brace is found in U.S. Pat. No. 4,697,770. As seen therein, the sway brace secures a fluid supply line to a joist or other building structure by means of an elongated tubular bracing member which is held adjacent one of its ends by the sway brace and is fasten at its other end to the joist by a pair of bolts or other approved fastening members.

Recent changes in building codes have required additional securement of the bracing member to the structure. This has been achieved through the use of an adapter plate having three fastener receiving apertures therein. The plate is positioned over the mounting bracket by which the bracing member is secured to the structure or, in the case of the above patented structure, over the flattened end of the bracing element, such that two of the apertures in the plate are aligned with the apertures in the bracket, leaving the third aperture in the plate in axial alignment with the super imposed apertures of the plate end bracket. Through this configuration three bolts or other securement fasteners can be used to secure the bracing member to the building structure, increasing the strength of the attachment. Alternatively, an adapter plate having four apertures can be employed with the bracket to provide two additional fastener receiving apertures for applications requiring even additional attachment support.

While the use of such adapter plates has heretofore satisfied code requirements, they are subject to relative movement with respect to the brackets in the event of eccentric loading during a seismic disturbance due to the lack of any positive engagement between the plates and the bracket. In addition, as various applications in different areas have different structural strength requirements, an inventory of differently sized adapter plates need to be maintained to provide the desired number of additional fasteners for the particular application. The load bolt adapter bracket assembly of the present invention not only provides the positive engagement between the bracket and plate lacking in the adapter plate/mounting bracket combinations heretofore available, but also eliminates the need to carry an inventory of differently sized adapter plates to accommodate either one or two additional fastening members as required for varying applications.

SUMMARY OF THE INVENTION

The present invention comprises an adjustable load bolt adapter bracket assembly for use in securing a bracing element to a fixed structure. The assembly is particularly adapted for use with a sway brace and a elongated bracing element for securing a fluid pipeline to a structure to prevent relative movement between the pipeline and structure in the event of a seismic disturbance. The assembly includes an attachment member for engaging one end of the bracing element and an adapter plate. The attachment member includes a flat plate portion which is adapted to abut a flat surface of the structure and defines a pair of axially aligned fastener receiving apertures therein. The adapter plate defines a first flat portion having a fastener receiving aperture centrally disposed therein and a second longer flat portion vertically offset from and extending parallel to the first flat portion. Depending and upstanding engagement tabs are defined by the adapter plate adjacent the interface of the first and second portions thereof and a pair of spaced fastener receiving apertures are disposed in the second portion of the adapter plate axially aligned with the aperture in the first portion thereof. By selectively disposing either the first or second portions of the adapter plate over the flat plate portion of the attachment member and aligning either the single aperture in the first portion of the plate with the outer aperture in the flat portion of the attachment member or both apertures in the second portion of the adapter plate with the two apertures in the attachment member, the number of available fastener receiving apertures for use in securing the attachment member to the structure can be selectively increased from the two apertures in the attachment member to three or to four thereby selectively increasing the strength of the securement to meet the structural requirements of the particular application.

It is the principal object of the present invention to provide an improved load bolt adapter bracket assembly for use with a sway brace in securing a bracing element between a fluid pipeline and a structure to anchor the pipeline to the structure and limit relative movement therebetween.

It is another object of the present invention to provide a load bolt adapter bracket assembly for use in securing a bracing element to a fixed structure which can selectively accommodate either two, three or four fastening members for securing the bracket to the structure to meet different structural strength attachment requirements without having to maintain an inventory of differently sized adapter plates.

It is yet another object of the present invention to provide an adjustable load bolt adapter bracket assembly for use in securing a bracing element to a fixed structure which provides a positive engagement between the components of the assembly to prevent relative movement between said components upon the assembly being subjected to an eccentric loading.

These and other objects and advantages of the present invention will become readily apparent from the following detail description taken in conjunction with the accompanying drawings.

DESCRIPTION OF THE PREFERRED EMBODIMENT

In the drawings

Figure 1:
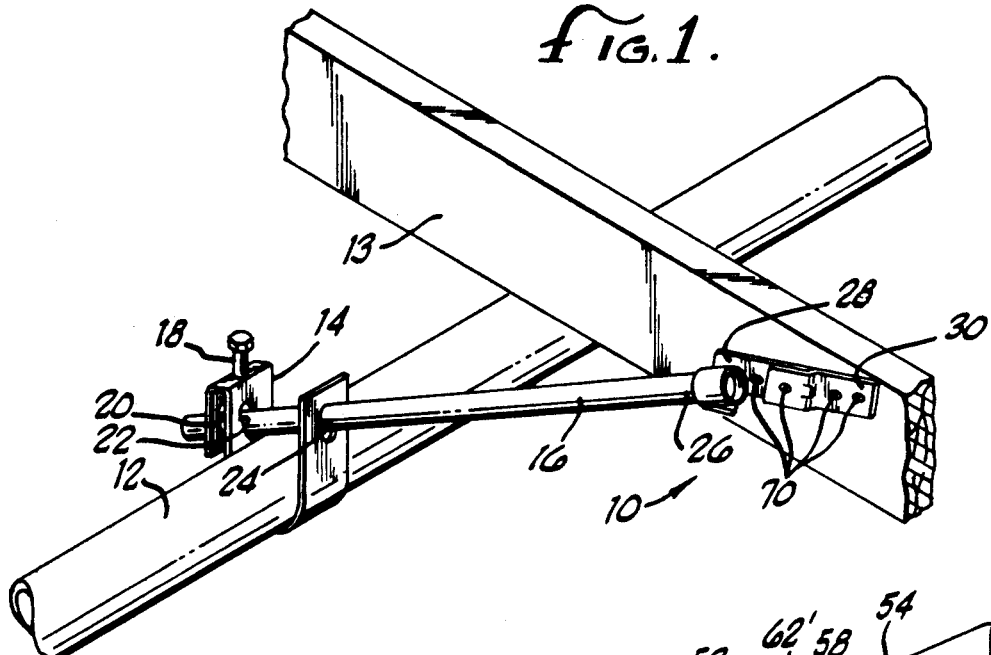
FIG. 1 is a perspective view of the adjustable load bolt adapter bracket assembly of the present invention in use with a sway brace and bracing element to secure a pipeline to a building joist.
Figure 5:
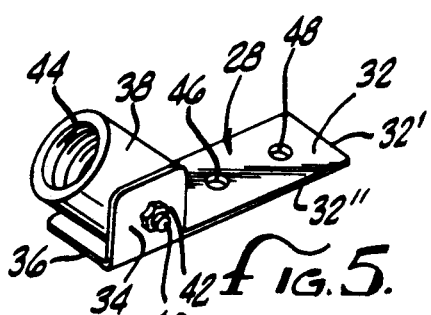
FIG. 5 is a perspective view of the attachment member portion of the present invention.
Figure 2:
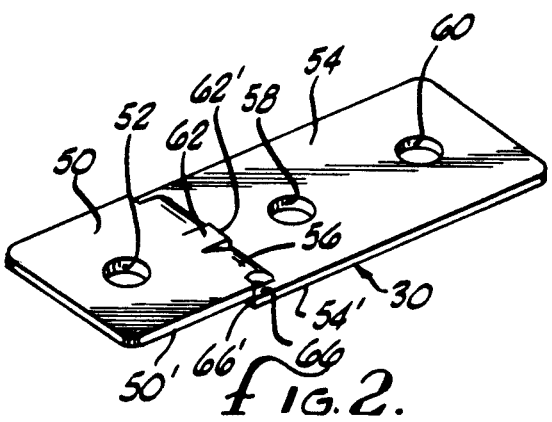
FIG. 2 is a perspective view of the adapter plate portion of the bracket assembly of the present invention.

Referring now in detail to the drawings, FIG. 1 illustrates the use of the bracket assembly 10 of the present invention to secure a water pipe 12 to a building joist 13 by means of a sway brace 14 and ridged bracing element 16. As seen therein, the sway brace 14 ridgedly secures the bracing element 16 to the water pipe 12 by means of a bolt member 18 and the perimeter walls of aligned apertures 20, 22 and 24 in the sway brace. The operation of sway brace 14 is described in detail in U.S. Pat. No. 4,697,770. The ridged bracing element 16 is preferably defined by cylindrical metal pipe provided with external threads adjacent the extended end 26 thereof.

The bracket assembly 10 comprises an attachment member 28 and adapter plate 30. The attachment member 28 is preferably constructed of steel and is about 3/16-¼ inch thick and defines a flat metal plate portion 32 having an upstanding lateral wall 34 adjacent end 36 thereof. A cylindrical bracing element receiving member 38 is pivotedly mounted on lateral wall 34 by means of a suitable bolt 40 and nut 42 and is provided with internal threads 4 adapted to mate with the external threads adjacent end 26 of the bracing element 16 So as to ridgedly secure the extended end of the bracing element 16 to the attachment member 28. The flat plate portion 32 of attachment member 28 defines a pair of spaced axially aligned fastener receiving apertures 46 and 48 therein.

The adapter plate 30, also preferably constructed of 3/16-¼ inch steel, defines a first portion 50 having a single fastener receiving aperture 52 centrally disposed therein and a second longer portion 54 which is vertically offset from portion 50 by means of a bend 56 and extends parallel to portion 50 in axial alignment therewith. Portion 54 of plate 30 defines a pair of spaced fastener receiving apertures 58 and 60 therein axially aligned with aperture 52 in the first portion 50 of plate 30. A centrally disposed engagement stop 62 defining a transverse abutment surface 62' is punch-formed in the end of the first portion 50 of adapter plate 30 adjacent the bend 56 therein so a to project toward the second portion 54 of plate 30. A pair of lateral engagement stops 64 and 66 defining transverse abutment surfaces 64' and 66' respectively are similarly formed at the end of the second portion 54 of the adapter plate adjacent the bend 56 therein so as to project toward the first portion 50 of plate 30.

Figure 6:
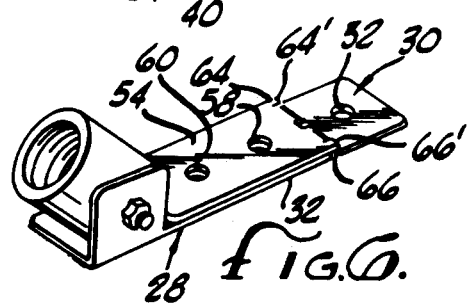
FIG. 6 is a perspective view of the adapter bracket assembly of the present invention positioned to provide three fastener receiving apertures.
Figure 3:
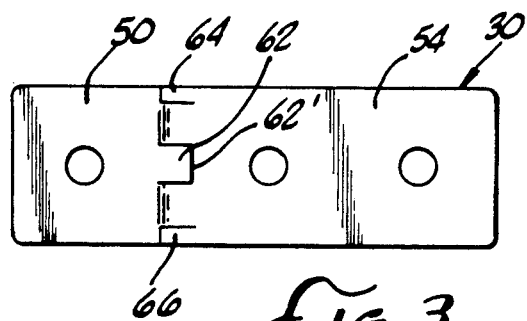
FIG. 3 is a plan view of the adapter plate portion of the assembly of the present invention.

By disposing the second portion 54 of the adapter plate 30 over the plate portion 32 of attachment member 28 such that the centrally formed engagement stop 62 on plate 30 abuts the end 32' of the plate portion of attachment member 28, the fastener member receiving apertures 60 and 58 of plate 30 are in vertical alignment with apertures 46 and 48 of attachment member 28 as seen in FIG. 6 and the surface 50' of adapter plate 30 lies in the same plane as the bottom surface 32" of attachment member 28. In this configuration, the aligned apertures of the adapter plate and attachment member and aperture 52 on portion 50 of the adapter plate are adapted to receive three fastening bolts 70 or other approved fastening members to secure the bracket assembly 10 to joist 14 as opposed to being only able to receive two such bolts without the use of the adapter plate. Further, the abutment of surface 62' of engagement stop 62 on plate 30 with the end 32' of the plate portion 32 of the attachment member 28 provides a positive engagement between the plate 30 and attachment member 28 to inhibit relative movement therebetween upon the assembly 10 being subjected to an eccentric loading as would occur during a seismic disturbance.

Figure 7:
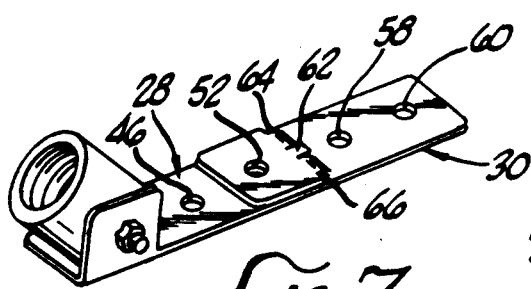
FIG. 7 is a perspective view of the bracket assembly of the present invention positioned to define four fastener receiving apertures.
Figure 4:
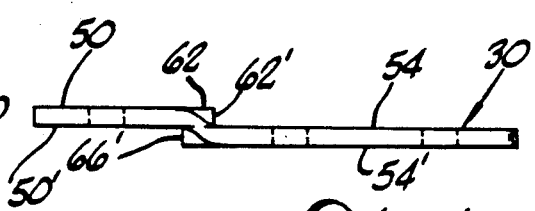
FIG. 4 is a side view of the adapter plate portion of the present invention.
Figure 8:
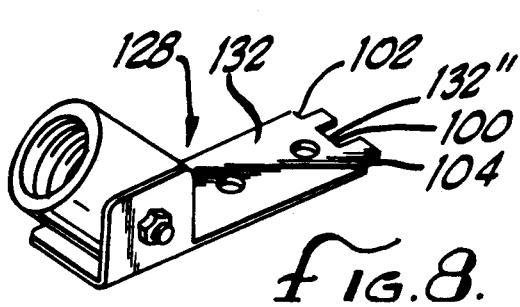
FIG. 8 is a perspective view of a second embodiment of the attachment member portion of the present invention.
Figure 9:
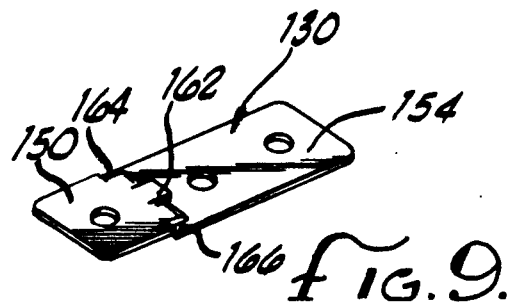
FIG. 9 is a perspective view of a second embodiment of the adapter plate portion of the present invention.

In those instances wherein the applicable building codes require additional securement strength, the adapter plate 30 need only be reversed and inverted with respect to the attachment member 28 to the position illustrated in FIG. 7. In this disposition, the end 32' of the plate portion of attachment member 28 engages the two lateral abutment surfaces 64' and 66' of engagement stops 64 and 66 on plate 30, aperture 52 on plate 30 is in vertical alignment with aperture 48 in the attachment member 28, and surface 54' on plate 30 lies in the same plane as the underside 32' of the plate portion 32' of attachment member 28. So disposed, the bracket assembly 10 is adapted to receive four fastening bolts 70 as seen in FIG. 7 as opposed to three such fastening members in the prior configuration of FIG. 6.

Figure 10:
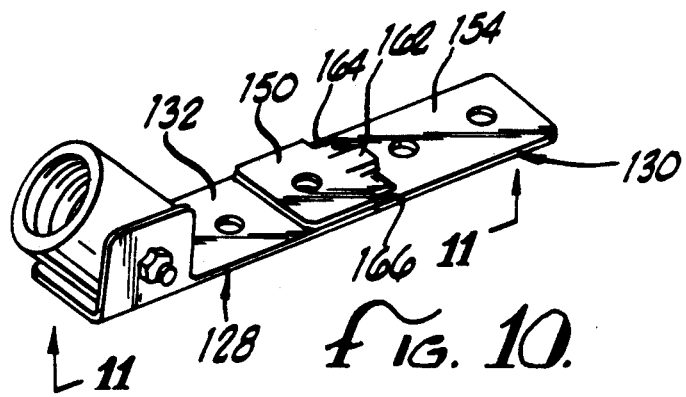
FIG. 10 is a perspective view of a second embodiment of the bracket assembly of the present invention positioned to define four fastener receiving apertures.
Figure 11:
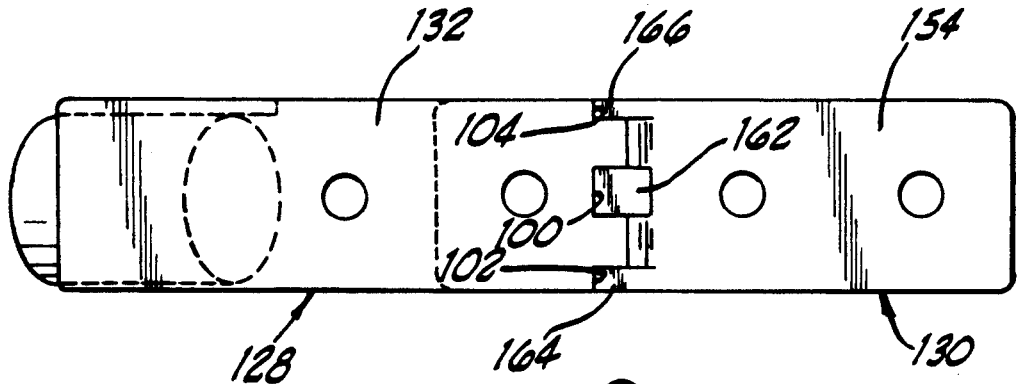
FIG. 11 is a bottom view of the bracket assembly of FIG. 10.

In an alternate embodiment of the invention illustrated in FIGS. 8-11 the extended end 132" of the flat plate portion 132 of the attachment member 128 is modified so as to define a control recess 100 therein and a pair of lateral recesses 102 and 104. Recess 100 is adapted to receive the centrally disposed engagement stop 102 formed in adapter plate 130 when the second portion 154 of plate 130 is disposed over the flat plate portion 132 of attachment member 128 and recesses 102 and 104 are adapted to receive the lateral engagement stops 164 and 166 when the first portion 150 of plate 130 is disposed over flat plate portion 132 as seen in FIG. 10. Engagement stops 162, 164 and 166 are preferably formed similarly to stops 62, 64 and 66 of the prior embodiment, albeit slight longer in axial length and when disposed in the corresponding recesses in the adapter plate 130 provide an interlock between plate 130 and attachment member 128.

Various other changes and modifications may be made in carrying out the present invention without departing from the spirit and scope thereof. Insofar as these changes and modifications are within the purview of the appended claims, they are to be considered as part of the present invention.

I claim:

1. An adjustable bracket assembly for selective use with a varying number of fasteners to secure a bracing element to affixed structure, said assembly comprising:

an attachment member having means thereon for engaging the bracing element and defining a flat plate portion extending from said means and having a pair of axially aligned fastener receiving apertures therein;

and an adapter plate for cooperation with said attachment member to provide additional fastener receiving apertures for the securement of the bracing element to the structure, said plate defining a first portion having a first fastener receiving aperture disposed therein, a second portion vertically offset from said first portion and extending parallel to said first portion and defining a pair of fastener receiving apertures therein, a first engagement member projecting from said first portion toward said second portion and being vertically offset from said second portion so as to engage the extended end of said attachment member upon said second portion of said adapter plate being disposed on said flat plate portion of said attachment member and the apertures in said second portion being disposed over and aligned with the apertures in said attachment member, and a pair of second engagement members projecting from said second portion toward said first portion and being vertically offset from said first portion so as to engage the extended end of said attachment member upon said first portion of said adapter plate being disposed on said flat plate portion of said attachment member and the aperture in said first portion being disposed over and aligned with one of the apertures in said attachment member, whereby said bracket assembly can accommodate either two, three or four fasteners for securing the bracing element to the structure.

2. The assembly of claim 1 wherein said second portion of said adapter plate defines an axial length greater than the axial length of said first portion thereof, said first engagement member is axially aligned with said apertures in said adapter plate and defines a transverse engagement surface for abutting the extended end of said attachment member, and said second engagement members are disposed adjacent the lateral edges of said adapter plate each define a transverse engagement surface for abutting the extended end of said attachment member.

3. The assembly of claim 1 wherein the flat plate portion of said attachment member defines a central recess therein adapted to receive said first engagement member upon said second portion of said adapter plate being disposed over said flat plate portion of said attachment member and a pair of lateral recesses adapted to receive said second engagement members upon said first portion of said adapter plate being disposed over said flat plate portion of said attachment member.

4. The assembly of either claims 1, 2 or 3 wherein said adapter plate defines a bend therein to effect the vertical offset of said first and second portions thereof, said first and second stop members being disposed adjacent said bend.

5. The assembly of claim 1 wherein said engaging means on said attachment member comprises an upstanding sidewall portion integrally formed with said flat plate portion and a cylindrical member defining internal threads therein adapted to receive and threadably engage the bracing element, said cylindrical member being pivotedly mounted on said upstanding wall portion.

6. An adjustable bracket assembly for selective use with a varying number of fasteners to secure a bracing element to a fixed structure, said assembly comprising:
an attachment member including a flat plate portion, an upstanding sidewall portion integrally formed with said flat plate portion and a cylindrical member defining internal threads therein adapted to receive and threadably engage the bracing element, said cylindrical member being pivotedly mounted on said upstanding wall portion; and
an adapter plate for cooperation with said attachment member to provide additional fastener receiving apertures for the securement of the bracing element to the structure, said plate defining a first portion having a first fastener receiving aperture disposed therein and terminating in a bend, a second portion end vertically offset from said first portion and extending from said bend parallel to said first portion and defining a pair of fastener receiving apertures therein, a first engagement member projecting from said first portion toward said second portion and being vertically offset from said second portion so as to engage the extended end of said attachment member upon said second portion of said adapter plate being disposed on said flat plate portion of said attachment member and the apertures in said second portion being disposed over and aligned with the apertures in said attachment member, and a pair of second engagement members projecting from said second portion toward said first portion and being vertically offset from said first portion so as to engage the extended end of said attachment member upon said first portion of said adapter plate being disposed on said flat plate portion of said attachment member and the aperture in said first portion being disposed over and aligned with one of the apertures in said attachment member, whereby said bracket assembly can accommodate either two, three or four fasteners for securing the bracing element to the structure.

7. The assembly of claim 6 wherein said first engagement member is axially aligned with said apertures in said adapter plate and defines a transverse engagement surface for abutting the extended end of said attachment member, and said second engagement members are disposed adjacent the lateral edges of said adapter plate and each define a transverse engagement surface for abutting the extended end of said engagement member.

8. The assembly of claim 6 wherein the flat plate portion of said attachment member defines a central recess therein adapted to receive said first engagement member upon said second portion of said adapter plate being disposed over said flat plate portion of said attachment member and a pair of lateral recesses adapted to receive said second engagement members upon said first portion of said adapter plate being disposed over said flat plate portion of said attachment member.

9. An adapter plate for use with a plurality of fasteners, a bracing element and an attachment member of the type having means thereon for engaging the bracing element and a flat plate portion having a pair of axially aligned apertures therein for use in providing a variable number of axially aligned fastener receiving apertures for selectively securing the bracing element to a fixed structure with a correspondingly variable number of fasteners, said plate comprising:
a first portion having a first fastener receiving aperture disposed therein;
a second portion having an axial length greater than the axial length of said first portion, being vertically offset from said first portion, extending parallel to said first portion and defining a pair of fastener receiving apertures therein in axial alignment with said aperture in said first portion;

a first engagement member projecting from said first portion toward said second portion and being vertically offset from said second portion so as to engage the attachment member upon said second portion of said adapter plate being disposed on the flat plate portion of the attachment member and the apertures in said second portion being disposed over and aligned with the apertures in the attachment member; and a pair of second engagement members projecting from said second portion toward said first portion and being vertically offset from said first portion so as to engage the attachment member upon said first upon the first portion of the attachment plate being disposed on the flat portion of the attachment member and the aperture in said first portion being disposed over and aligned with one of the apertures in the attachment member, whereby the number of fastener receiving apertures can be selectively increased from two to three or four for increased strength in the securement of the bracing element to the structure.

10. The plate of claim 9 wherein said second portion of said adapter plate defines an axial length greater than the axial length of said first portion thereof, said first engagement member is axially aligned with said apertures in said adapter plate and defines a transverse engagement surface for abutting the extended end of said attachment member, and said second engagement members are disposed adjacent the lateral edges of said adapter plate each define a transverse engagement surface for abutting the extended end of said attachment member.

11. The plate of either claims 9 or 10 wherein said adapter plate defines a bend therein to effect the vertical offset of said first and second portions thereof, said first and second engagement members being disposed adjacent said bend.

* * * * *

UNITED STATES PATENT AND TRADEMARK OFFICE
CERTIFICATE OF CORRECTION

PATENT NO. : 5,004,193
DATED : April 2, 1991
INVENTOR(S) : Kraig A. Kirschner

It is certified that error appears in the above-identified patent and that said Letters Patent is hereby corrected as shown below:

Col. 3, line 39, delete "4" and replace with --44--.

Col. 3, line 40, change "So" to --so--.

Col. 3, line 58, delete "a" replace with --as--.

Signed and Sealed this

Twenty-third Day of March, 1993

Attest:

STEPHEN G. KUNIN

*Attesting Officer*     Acting Commissioner of Patents and Trademarks